(12) United States Patent
Doany et al.

(10) Patent No.: US 9,584,225 B2
(45) Date of Patent: Feb. 28, 2017

(54) REALIZING COARSE WAVELENGTH-DIVISION MULTIPLEXING USING STANDARD MULTIMODE OPTICAL FIBERS

(71) Applicant: International Business Machines Corporation, Armonk, NY (US)

(72) Inventors: Fuad E. Doany, Katonah, NY (US); Daniel M. Kuchta, Patterson, NY (US); Benjamin G. Lee, New York, NY (US); Petar K. Pepeljugoski, Tarrytown, NY (US); Clint L. Schow, Ossining, NY (US); Mehmet Soyuer, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 14/644,540

(22) Filed: Mar. 11, 2015

(65) Prior Publication Data

US 2016/0269124 A1    Sep. 15, 2016

(51) Int. Cl.
*H04J 14/02* (2006.01)
*H04B 10/572* (2013.01)
(Continued)

(52) U.S. Cl.
CPC ....... *H04B 10/572* (2013.01); *G02B 27/0012* (2013.01); *H04B 10/2581* (2013.01); *H01S 3/094069* (2013.01)

(58) Field of Classification Search
CPC ........... H04J 14/0221; H04B 10/07955; H04B 10/07953; H04B 10/572
See application file for complete search history.

(56) References Cited

U.S. PATENT DOCUMENTS 6,198,864 B1   3/2001   Lemoff et al.
7,242,870 B2   7/2007   Guan et al.
(Continued)

FOREIGN PATENT DOCUMENTS

EP   1422794 A2   5/2004
EP   2139128 A1   12/2009
(Continued)

OTHER PUBLICATIONS

Doany et al., "Realizing Coarse Wavelength-Division Multiplexing Using Standard Multimode Optical Fibers", U.S. Appl. No. 14/644,540, filed Jun. 19, 2015, 49 pages.
(Continued)

*Primary Examiner* — Dzung Tran
(74) *Attorney, Agent, or Firm* — Yee & Associates, P.C.; Jennifer R. Davis

(57) ABSTRACT

Tuning parameters of individual wavelength channels transmitted over a multimode optical fiber is provided. Characteristics of the multimode optical fiber used for an optical data link within an optical signal transmission system are retrieved. A wavelength channel grid including each central wavelength in a plurality of central wavelengths that corresponds to each particular wavelength channel in a plurality of wavelength channels used to transmit data via optical signals over the multimode optical fiber is determined. A maximum allowable data rate is calculated for each wavelength channel based on the characteristics of the multimode optical fiber at defined channel wavelengths, optical signal transceiver specifications, and data transmission performance requirements for the optical signal transmission system. Operational parameters are assigned to each wavelength channel based on the calculated maximum allowable data rate for each wavelength channel to achieve the data (Continued)

transmission performance requirements for the optical signal transmission system.

13 Claims, 11 Drawing Sheets

(51) Int. Cl.
*G02B 27/00* (2006.01)
*H04B 10/2581* (2013.01)
*H01S 3/094* (2006.01)

(56) References Cited

U.S. PATENT DOCUMENTS

| | | | |
|---|---|---|---|
| 8,879,920 B2 | 11/2014 | Lumineau et al. | |
| 2002/0167693 A1 | 11/2002 | Vrazel et al. | |
| 2005/0157995 A1 | 7/2005 | Guan et al. | |
| 2005/0254752 A1 | 11/2005 | Domash et al. | |
| 2006/0062514 A1 | 3/2006 | Agranat | |
| 2010/0021170 A1 | 1/2010 | Lumineau et al. | |
| 2011/0211839 A1 | 9/2011 | Lee et al. | |
| 2012/0269506 A1* | 10/2012 | Vassilieva | H04J 14/0221 398/26 |
| 2014/0016938 A1* | 1/2014 | Sandstrom | H04B 10/506 398/72 |
| 2014/0334814 A1* | 11/2014 | Ji | H04J 14/0221 398/26 |
| 2015/0282147 A1* | 10/2015 | Schmidt | H04W 12/08 455/411 |
| 2016/0269141 A1 | 9/2016 | Doany et al. | |

FOREIGN PATENT DOCUMENTS

| | | |
|---|---|---|
| FR | 2932932 A1 | 12/2009 |
| WO | 02089380 A2 | 11/2002 |

OTHER PUBLICATIONS

List of IBM Patents or Patent Applications Treated as Related, 2 pages.

Al Amin et al., "Dual-LP11 mode 4×4 MIMO-OFDM transmission over a two-mode fiber," Optics Express, vol. 19, No. 17, Aug. 2011, pp. 16672-16679.

Banerjee et al., "Wavelength-division-multi-plexed passive optical network (WDM-PON) technologies for broadband access: a review [Invited]," Journal of Optical Networking, vol. 4, No. 11, Nov. 2005, pp. 737-758.

Office Action, Dated Sep. 8, 2016, regarding U.S. Appl. No. 14/744,259, 14 pages.

Notice of Allowance, dated Nov. 17, 2016, regarding U.S. Appl. No. 14/744,259, 9 pages.

* cited by examiner

REALIZING COARSE WAVELENGTH-DIVISION MULTIPLEXING USING STANDARD MULTIMODE OPTICAL FIBERS

BACKGROUND

1. Field

The disclosure relates generally to transmission of data via optical fibers and more specifically to transmitting coarse wavelength-division multiplexed optical signals over a standard multimode optical fiber by adjusting a data rate of each individual channel transmitted over the standard multimode optical fiber to match a modal bandwidth of the standard multimode optical fiber at the wavelength of each individual channel.

2. Description of the Related Art

Fiber-optic communication is a method of transmitting information from one place to another by sending pulses of light through an optical fiber. An optical fiber is a flexible, transparent fiber made of extruded glass (silica) or plastic. The optical fiber functions as a waveguide or light pipe to transmit light (i.e., optical signals) between the two ends of the fiber. Optical fibers are widely used in fiber-optic communications because the optical fibers transmit information at higher bandwidths (data rates) than wire cables. Optical fibers that support many propagation paths or transverse modes are called multimode fibers (MMF), while those that only support a single mode are called single-mode fibers (SMF). Typically, multi-mode fibers have wider core diameters and are used for short-distance communication links and for applications where high power must be transmitted. Single mode fibers are used for most long-distance communication links.

Multimode optical fibers are commonly classified as OM1, OM2, OM3, and OM4 based on the modal bandwidth characteristics of the fiber. OM stands for optical multimode. OM3 and OM4 fibers are laser optimized and may be used with vertical cavity surface emitting lasers (VCSELs), for example. VCSELs are capable of modulation over 10 gigabits per second (Gbits/s) and are used in many high speed networks.

The amount of data or bits that can be transmitted or processed per unit time over a fiber-optic communication system is referred to as the bit rate, data rate, or data throughput of the system. Traditionally, system bit rate and baud rate is increased by increasing the number of channels carrying data, increasing the bit rate of each channel, or both. In order to meet ever-increasing bandwidth demands, aggregate throughput in fiber-optic communication systems has conventionally been increased by using wavelength-division multiplexing (WDM), time-division multiplexing (TDM), or some combination of the two techniques. Wavelength-division multiplexing techniques increase the number of channels transmitted on a particular optical fiber, while time-division multiplexing techniques increase the bit rate of each individual channel. Wavelength channel spacing of more than 8 nm is generally called coarse wavelength-division multiplexing (CWDM) and typically utilizes wavelengths from 1271 nm to 1611 nm.

SUMMARY

According to one illustrative embodiment, a computer-implemented method for tuning parameters of individual wavelength channels transmitted over a multimode optical fiber is provided. A processor retrieves characteristics of the multimode optical fiber used for an optical data link within an optical signal transmission system. The processor determines a wavelength channel grid including each central wavelength in a plurality of central wavelengths that corresponds to each particular wavelength channel in a plurality of wavelength channels used to transmit data via optical signals over the multimode optical fiber. The processor calculates a maximum allowable data rate for each wavelength channel in the plurality of wavelength channels based on the characteristics of the multimode optical fiber at defined channel wavelengths, optical signal transceiver specifications, and data transmission performance requirements for the optical signal transmission system. The processor assigns operational parameters to each wavelength channel in the plurality of wavelength channels based on the calculated maximum allowable data rate for each wavelength channel in the plurality of wavelength channels to achieve the data transmission performance requirements for the optical signal transmission system. According to other illustrative embodiments, a computer system and a computer program product for tuning parameters of individual wavelength channels transmitted over a multimode optical fiber are provided.

According to another illustrative embodiment an optical signal transmitter apparatus is provided. The optical signal transmitter apparatus includes host integrated circuit. The host integrated circuit includes a set of one or more electronic time-division multiplexers. Each electronic time-division multiplexer combines two or more electrical signal inputs into one electrical signal output. The host integrated circuit receives a plurality of electrical signal inputs and outputs a plurality of electrical signal outputs. A number of the plurality of electrical signal outputs is less than a number of the plurality of electrical signal inputs due to electronic time-division multiplexing of a set of electrical signal inputs in the plurality of electrical signal inputs by the set of one or more electronic time-division multiplexers in the host integrated circuit. A number of the first set of electrical signal inputs that is multiplexed is less than the number of the plurality of electrical signal inputs. A second set of electrical signal inputs in the plurality of electrical signal inputs is not multiplexed. The optical signal transmitter apparatus also includes a laser diode driver integrated circuit. The laser diode driver integrated circuit includes a plurality of laser diode drivers that drive a plurality of corresponding laser diodes to output a plurality of optical signal outputs into a multimode optic fiber for transmission based on the first set of electrical signal inputs that is multiplexed and the second set of electrical signal inputs that is not multiplexed. The optical signal transmitter apparatus further includes electrical signal transmission lines connecting the host integrated circuit to the laser diode driver integrated circuit. The electrical signal transmission lines are located on a chip carrier including the host integrated circuit and the laser diode driver integrated circuit.

According to yet another illustrative embodiment an alternative optical signal transmitter apparatus is provided. The alternative optical signal transmitter apparatus includes a host integrated circuit. The host integrated circuit includes a set of one or more electronic time-division multiplexers and a plurality of laser diode drivers. Each electronic time-division multiplexer combines two or more electrical signal inputs into one electrical signal output and each laser diode driver drives a corresponding laser diode to output a plurality of optical signal outputs into a multimode optic fiber for transmission. The host integrated circuit receives a plurality of electrical signal inputs and outputs the plurality of electrical signal outputs. A number of the plurality of electrical signal outputs is less than a number of the plurality of electrical signal inputs due to electronic time-division multiplexing of a first set of electrical signal inputs in the plurality of electrical signal inputs by the set of one or more electronic time-division multiplexers in the host integrated circuit. A number of the first set of electrical signal inputs that is multiplexed is less than the number of the plurality of electrical signal inputs. A second set of electrical signal inputs in the plurality of electrical signal inputs is not multiplexed. The alternative optical signal transmitter apparatus also includes a plurality of electrical signal transmission lines connecting the plurality of laser diode drivers to corresponding laser diodes. The plurality of electrical signal transmission lines is located on a chip carrier including the host integrated circuit.

DETAILED DESCRIPTION

Figure 1:
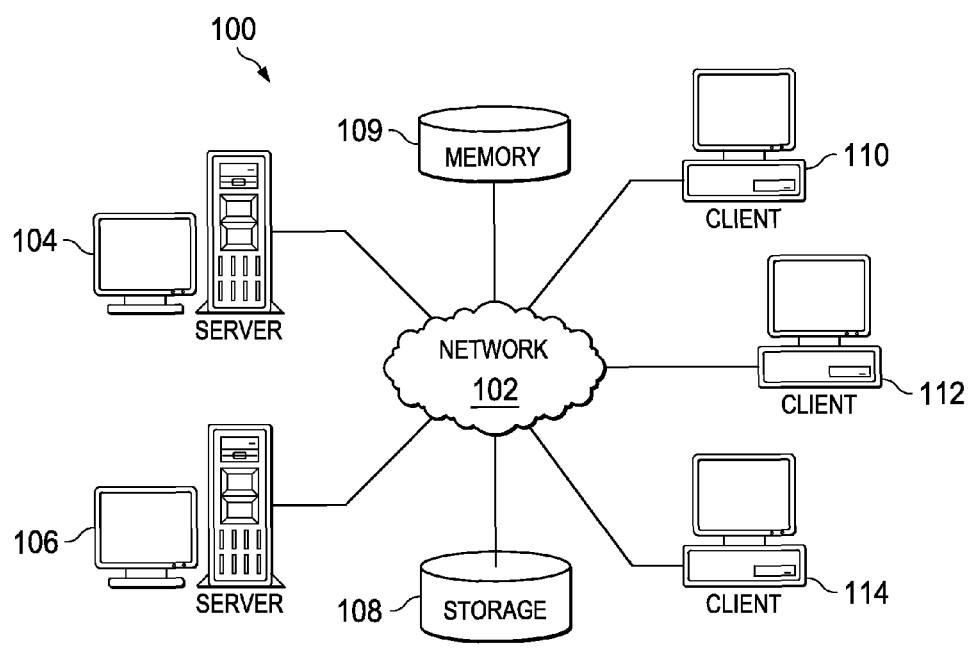
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-8, diagrams of data processing environments are provided in which illustrative embodiments may be implemented. It should be appreciated that FIGS. 1-8 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, fiber-optic cables.

In the depicted example, server 104 and server 106 connect to network 102, along with storage 108 and memory 109. Server 104 and server 106 may be, for example, server computers with high-speed connections to network 102. In addition, server 104 and server 106 may provide one or more services to client devices connected to network 102. For example, server 104 and server 106 may provide fiber-optic communication services to connected client devices.

Client device 110, client device 112, and client device 114 also connect to network 102. Client devices 110, 112, and 114 are clients to server 104 or server 106. In the depicted example, server 104 and server 106 may provide information, such as boot files, operating system images, and software applications to client devices 110, 112, and 114.

In this example, client devices 110, 112, and 114 are computers, such as desktop computers or network computers with optical communication links to network 102. However, it should be noted that client devices 110, 112, and 114 are intended as examples only. In other words, client devices 110, 112, and 114 may include other network devices, such as printers, for example.

Storage 108 is a network storage device capable of storing data in a structured format or unstructured format. Storage 108 may represent a plurality of storage devices connected to optical network 102. For example, storage 108 may be a redundant array of independent disks (RAID) or the like.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client device 110 over network 102 for use on client device 110.

In the depicted example, network data processing system 100 may be implemented as a number of different types of communication networks, such as, for example, a local area network (LAN) or a storage area network (SAN). FIG. 1 is intended as an example, and not as an architectural limitation for the different illustrative embodiments.

Figure 2:
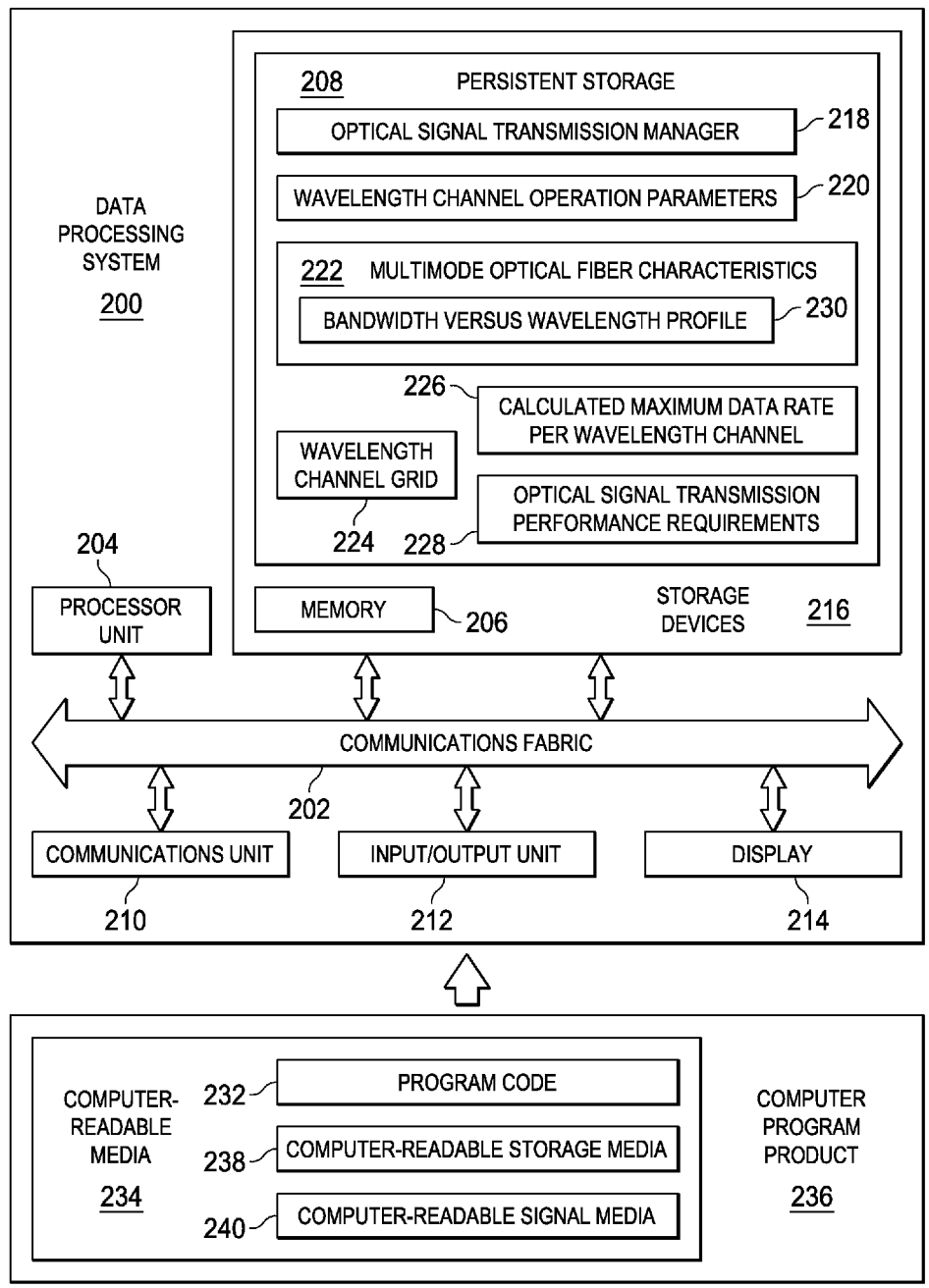
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214. However, it should be noted that I/O unit 212 and display 214 may be optional features.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208. Persistent storage 208 also may include non-volatile memory that is non-removable.

In this example, persistent storage 208 stores optical signal transmission manager 218, wavelength channel operation parameters 220, multimode optical fiber characteristics 222, wavelength channel grid 224, calculated maximum data rate per wavelength channel 226, and optical signal transmission performance requirements 228. Optical signal transmission manager 218 controls transmission of coarse wavelength-division multiplexed optical signals over a standard multimode optical fiber by adjusting operational parameters of each individual wavelength channel in a plurality of wavelength channels transmitted over the standard multimode optical fiber to match a modal bandwidth of the standard multimode optical fiber at the dedicated wavelength of each particular individual wavelength channel. Wavelength channel operation parameters 220 represent the determined operational parameters of each individual wavelength channel in the plurality of wavelength channels transmitted over the standard multimode optical fiber. Wavelength channel operation parameters 220 include, for example, data rate or bit rate of a wavelength channel, equalizer tap weights for the wavelength channel, optical signal transmitter output power for the wavelength channel, on and off state of the wavelength channel, the lasing wavelength of the wavelength channel, et cetera.

Optical signal transmission manager 218 also takes into account multimode optical fiber characteristics 222 when determining how to control the transmission of coarse wavelength-division multiplexed optical signals over the standard multimode optical fiber. Multimode optical fiber characteristics 222 are the physical characteristics of the standard multimode optical fiber. Multimode optical fiber characteristics 222 include, for example, modal bandwidth of the fiber, dispersion of the fiber, length of the fiber, optical signal loss of the fiber, et cetera. Modal bandwidth is the signaling rate times distance unit and is typically expressed as megahertz·kilometer (MHz·km). Multimode optical fiber characteristics 222 also include bandwidth versus wavelength profile 230. Bandwidth versus wavelength profile 230 is a determined profile of the modal bandwidth of the particular multimode optical fiber versus the wavelength of each channel in the plurality of channels transmitted over the particular multimode optical fiber.

Wavelength channel grid 224 is a table of all the central frequencies and their corresponding wavelengths of channels allowed in a multimode optical fiber of a particular fiber-optic communications system network. Calculated maximum data rate per wavelength channel 226 represents a maximum allowable data rate or bit rate for each wavelength channel in a plurality of wavelength channels transmitted over the particular multimode optical fiber based on multimode optical fiber characteristics 222 of the particular multimode optical fiber at defined channel wavelengths, optical signal transceiver specifications, and optical signal transmission performance requirements 228. Optical signal transceiver specifications may include, for example, transmitter output power, extinction ratio, receiver sensitivity, and any transmitter or receiver-specific penalties, such as those resulting from relative intensity noise (RIN), inter-symbol interference, or inter-channel crosstalk. Optical signal transmission performance requirements 228 are the predefined requirements for optical signal transmission over the particular fiber-optic communications system network. Optical signal transmission performance requirements 228 may be, for example, a specified bit error rate (before or after error correction codes, if used), signal-to-noise ratio, or a threshold packet loss rate.

Communications unit 210, in this example, provides for communication with other computers, data processing systems, and devices via a network, such as network 102 in FIG. 1. Communications unit 210 may provide communications through the use of physical communication links. The physical communication links may utilize, for example, fiber-optic cables to establish a physical communication link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example. Also, it should be noted that input/output unit 212 and display 214 may be combined.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 232 is located in a functional form on computer readable media 234 that is removable or non-removable and may be loaded onto or transferred to data processing system 200 for running by processor unit 204. Program code 232 and computer readable media 234 form computer program product 236. In one example, computer readable media 234 may be computer readable storage media 238 or computer readable signal media 240. Computer readable storage media 238 may include, for example, an optical or magnetic disc that is inserted or placed into a drive or other device that is part of persistent storage 208 for transfer onto a storage device, such as a hard drive, that is part of persistent storage 208. Computer readable storage media 238 also may take the form of a persistent storage, such as a hard drive, a thumb drive, or a flash memory that is connected to data processing system 200. In some instances, computer readable storage media 238 may not be removable from data processing system 200.

Alternatively, program code 232 may be transferred to data processing system 200 using computer readable signal media 240. Computer readable signal media 240 may be, for example, a propagated data signal containing program code 232. For example, computer readable signal media 240 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 232 may be downloaded over a network to persistent storage 208 from another device or data processing system through computer readable signal media 240 for use within data processing system 200. For instance, program code stored in a computer readable storage media in a data processing system may be downloaded over a network from the data processing system to data processing system 200. The data processing system providing program code 232 may be a server computer, a client computer, or some other device capable of storing and transmitting program code 232.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 238 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that wavelength-division multiplexed transmission over multimode optical fibers has been utilized to increase bandwidth in short-distance (e.g., less than 300 meters) communication systems by combining multiple beams of light into a single transmission medium. Bandwidth limitations in multimode optical fiber systems are typically imposed by dispersive effects (most often modal dispersion, but chromatic dispersion and other effects may contribute), and result in a transmission barrier known as the bit rate-distance product for a given optical fiber makeup. Bit rate-distance product is a measure of usefulness of an optical fiber. Currently, optical fiber manufacturers counteract modal fiber dispersion by tailoring the graded-index profile of the optical fiber to offer maximum bandwidth at a particular wavelength or range of wavelengths, as specified by the relevant standard being adhered to.

As a result, wavelength-division multiplexed transmission has required custom design and manufacturing of multimode optical fibers that provide high bandwidths over the entire wavelength range of interest, which is costly. Another approach uses short lengths of dispersion compensating optical fibers to uniquely cancel the dispersive effects of the transmission medium for each channel individually at the end points of the optical link, adding significant complexity and cost to the fiber-optic system.

However, illustrative embodiments utilize a coarse wavelength-division multiplexed transmission system for transmitting over a standard multimode optical fiber, such as, for example, an OM3 or OM4 fiber, with customized electronics, such as, for example, electronic time-division multiplexers and de-multiplexers and channel-by-channel equalization devices, in the optical transceivers. Thus, illustrative embodiments mitigate the cost of custom optic fiber solutions by employing a standardized optical fiber, but with each channel data rate tailored to match the modal bandwidth of the standard optical fiber that is available at a particular channel's wavelength. However, it should be noted that alternative illustrative embodiments may utilize non-standard optical fibers as well. Further, illustrative embodiments utilize channel wavelengths in the 850 nanometer (nm) to 1100 nm range for coarse wavelength-division multiplexing of optical signals. However, it should be noted that illustrative embodiments are not restricted to an 850 nm to 1100 nm wavelength range. In other words, illustrative embodiments may utilize any range of wavelengths from 600 nm to 1650 nm, for example. In addition, illustrative embodiments utilize electronic time-division multiplexers and de-multiplexers to scale up or down the data rate on a channel-by-channel basis to achieve a desired data rate profile of the optical data link.

Illustrative embodiments scale data rates using coarse wavelength-division multiplexing without requiring custom-manufactured or non-standard optical fibers that increase cost. Additionally, illustrative embodiments may be used to replace existing data communication optical transceivers in legacy LANs without requiring optical fiber reinstallations. Although the added power consumption of the customized electronics, such as the electronic time-division multiplexers, may be significant, these customized electronics are already required in many fiber-optic systems in order to reach the high data rates or bit rates that make fiber-optics attractive. In addition, illustrative embodiments may utilize low-power complementary metal-oxide semiconductor (CMOS) chip technology to further lower cost. Further, illustrative embodiments may be implemented in, for example, a microcontroller including a non-volatile memory and excluding an input device, such as a keyboard, or a display.

Illustrative embodiments provide a per-channel data rate by tuning the electronic dispersion compensation and equalization to a channel's unique dispersion and loss characteristics and applying power management schemes where illustrative embodiments may disable or reduce a data rate of a channel or channels in order to reduce optical data link power. For example, illustrative embodiments may equip some channels with these options, while other channels are not so equipped. This includes training the optical data link, on a channel-by-channel basis, at startup in order to determine the optimized operating conditions, such as, for example, data rate, coding scheme, equalization parameters, et cetera.

Figure 3:
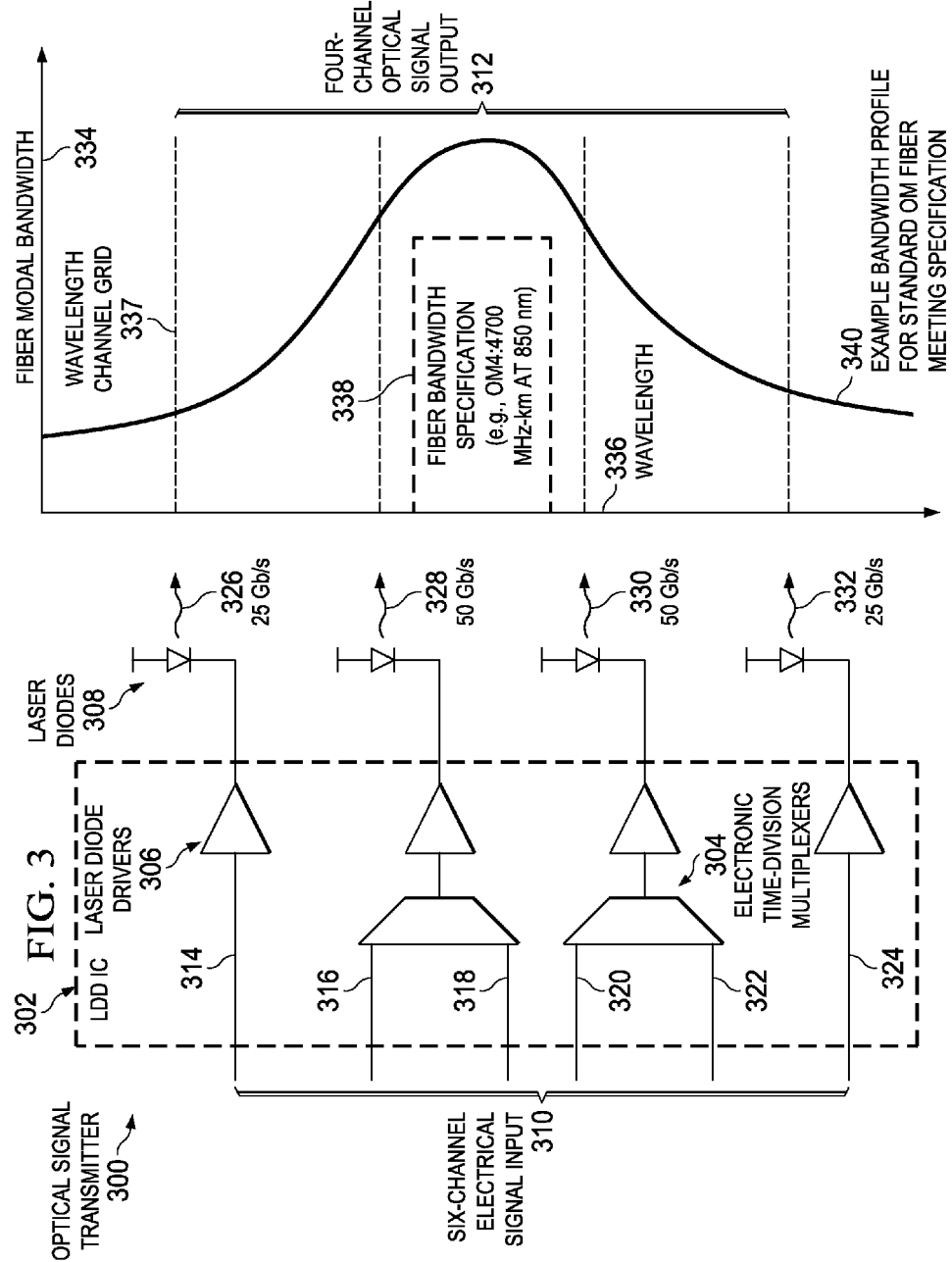
FIG. 3 is a diagram of an example of an optical signal transmitter in accordance with an illustrative embodiment.

With reference now to FIG. 3, a diagram of an example of an optical signal transmitter is depicted in accordance with an illustrative embodiment. Optical signal transmitter 300 is a hardware device that transmits data via optical signals over a standard multimode optical fiber. Optical signal transmitter 300 may be implemented on, for example, a host processor chip, such as processor unit 204 in FIG. 2.

Optical signal transmitter 300 includes laser diode driver (LDD) integrated circuit (IC) 302. LDD IC 302 includes electronic time-division multiplexers 304 and laser diode drivers 306. An electronic time-division multiplexer combines or serializes a set of two or more parallel signals into a single bit stream. Each of the two or more parallel signals are allocated or associated with a set of recurring time periods or time slots. The time slots are configured such that the time slots associated with one signal do not overlap the time slots associated with another signal. In this example, LDD IC 302 includes two electronic time-division multiplexers, but illustrative embodiments are not restricted to such. In other words, illustrative embodiments may include more or fewer electronic time-division multiplexers than illustrated. Also, illustrative embodiments may provide more electrical inputs to an electronic time-division multiplexer than illustrated (i.e., more than two).

Laser diode drivers 306 are circuits designed to drive laser diodes 308 to output optical signals. Laser diodes 308 may be, for example, VCSELs, each VCSEL having a different central wavelength and each central wavelength corresponding to a different channel. Laser diodes 308 may output the optical signals in, for example, an 850 nm to 1100 nm wavelength range or any subset of wavelength ranges therein. In this example, LDD IC 302 includes four laser diode drivers that drive four laser diodes, but illustrative embodiments are not restricted to such. In other words, illustrative embodiments may include more or fewer laser diode drivers and laser diodes than illustrated. Further, illustrative embodiments are not restricted to utilizing laser diodes and laser diode drivers. For example, illustrative embodiments may utilize other types of signal modulation devices, such as electro-absorption modulators, and drivers.

Also in this example, LDD IC 302 receives 6 channel electrical signal input 310 and outputs 4 channel optical signal output 312. Six channel electrical signal input 310 represents six individual channels of electrical signal inputs, each channel having an electrical signal input of 25 Gbits/s or 25 Gbits/s/channel. However, it should be noted that all bit rates (i.e., signal inputs and signal outputs) illustrated in the figures are examples only and not intended as restrictions on the different illustrative embodiments. In other words, the different illustrative embodiments may utilize any bit rate. Six channel electrical signal input 310 includes electrical signal inputs 314, 316, 318, 320, 322, and 324, which may be received from the host processor unit, for example. Electrical signal inputs 314-324 may be in the form of voltage waveforms, for example, which are transmitted over metal traces on a high-density chip carrier or printed circuit board. Four channel optical signal output 312 represents four individual channels of optical signal outputs, which include optical signal outputs 326, 328, 330, and 332. Each of optical signal outputs 326, 328, 330, and 332 represents a different wavelength channel output by a corresponding one of laser diodes 308.

Electrical signal inputs 314 and 324 are each input into a corresponding one of laser diode drivers 306, which in turn drive a corresponding one of laser diodes 308. The resultant optical signal outputs of laser diodes 308 for corresponding electrical signal inputs 314 and 324 are optical signal outputs 326 and 332, each at 25 Gbits/s, which is the same as the bit rate of the electrical signal inputs. Electrical signal inputs 316 and 318 and electrical signal inputs 320 and 322 are input into a corresponding one of electronic time-division multiplexers 304. The output of electronic time-division multiplexers 304 is input into a corresponding one of laser diode drivers 306, which in turn drive a corresponding one of laser diodes 308. The resultant optical signal output of a corresponding one of laser diodes 308 for electrical signal inputs 316 and 318 is optical signal output 328, which is at 50 Gbits/s instead of 25 Gbits/s due to the electronic time-division multiplexing of electrical signal inputs 316 and 318. Similarly, the resultant optical signal output of a corresponding one of laser diodes 308 for electrical signal inputs 320 and 322 is optical signal output 330, which also is at 50 Gbits/s.

Optical signal outputs 326, 328, 330, and 332 of laser diodes 308 are input into the standard multimode optical fiber for transmission over a fiber-optic system network, such as, for example, network data processing system 100 of FIG. 1. The bandwidth versus wavelength profile of the standard multimode optical fiber includes fiber modal bandwidth 334 and wavelength 336. Fiber modal bandwidth 334 illustrates the modal bandwidth characteristics of the standard multimode optical fiber (i.e., signaling rate times distance unit). Wavelength 336 illustrates the wavelength of each channel. The bandwidth versus wavelength profile also illustrates wavelength channel grid 337, which shows the relationship between a central frequency and a corresponding wavelength of a particular channel. Wavelength channel grid 337 may be, for example, wavelength channel grid 224 in FIG. 2. The bandwidth versus wavelength profile further illustrates fiber bandwidth specification 338, which is the specification of the multimode optical fiber defined by the manufacturer of the multimode optical fiber. In this example, the specification may be for an OM4 fiber of 4700 MHz·km at 850 nm. Reference numeral 340 is an example of a bandwidth profile for a standard OM fiber meeting specification 338.

Figure 4:
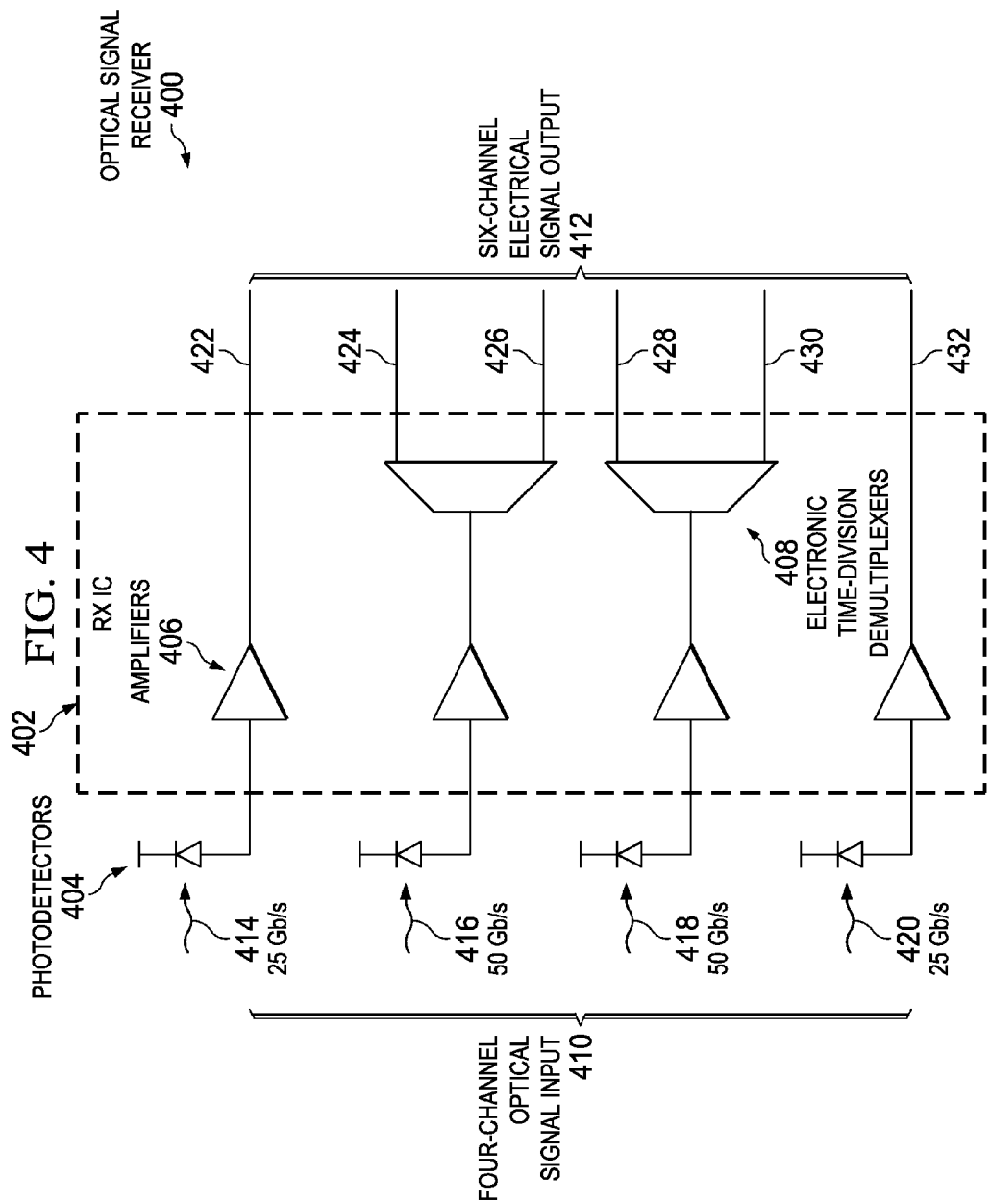
FIG. 4 is a diagram of an example of an optical signal receiver in accordance with an illustrative embodiment.

With reference now to FIG. 4, a diagram of an example of an optical signal receiver is depicted in accordance with an illustrative embodiment. Optical signal receiver 400 is a hardware device that receives data via optical signals over a standard multimode optical fiber. Optical signal receiver 400 may be implemented on, for example, a host processor chip, such as processor unit 204 in FIG. 2.

Optical signal receiver 400 includes receiver (RX) integrated circuit (IC) 402 and photodetectors 404. RX IC 402 includes amplifiers 406 and electronic time-division de-multiplexers 408. However, it should be noted that an alternative illustrative embodiment may include amplifiers 406 and electronic time-division de-multiplexers 408 on separate ICs and use electrical signal transmission lines to connect amplifiers 406 to electronic time-division de-multiplexers 408. In addition, alternative illustrative embodiments may include photodetectors 404 on RX IC 402. Photodetectors 404 are circuits designed to detect optical signal inputs, such as 4 channel optical signal input 410. Amplifiers 406 amplify the optical signal inputs coming from corresponding photodetectors 404. Amplifiers 406 may be, for example, transimpedance amplifiers, limiting amplifiers, and the like. Electronic time-division de-multiplexers 408 separate or de-serialize a single incoming bit stream into a set of two or more parallel signals.

In this example, optical signal receiver 400 includes four photodetectors and four amplifiers, but illustrative embodiments are not restricted to such. In other words, illustrative embodiments may include more or fewer photodetectors and amplifiers on optical signal receiver 400 than illustrated. Also in this example, RX IC 402 includes two electronic time-division de-multiplexers, but illustrative embodiments are not restricted to such. In other words, illustrative embodiments may include more or fewer electronic time-division de-multiplexers on RX IC 402 than illustrated.

Further in this example, RX IC 402 receives 4 channel optical signal input 410 and outputs 6 channel electrical signal output 412. Four channel optical signal input 410 represents four individual channels of optical signal inputs. Four channel optical signal input 410 includes optical signal inputs 414, 416, 418, and 420. Each of optical signal inputs 414, 416, 418, and 420 having an optical signal input of 25 Gbits/s, 50 Gbits/s, 50 Gbits/s, and 25 Gbits/s, respectively. Optical signal inputs 414, 416, 418, and 420 may be received from an optical signal transmitter, such as optical signal transmitter 300 in FIG. 3, via the standard multimode optical fiber. Four channel optical signal input 410 is similar to 4 channel optical signal output 312 in FIG. 3.

Six channel electrical signal output 412 represents six individual channels of electrical signal outputs, each channel having an electrical signal output of 25 Gbits/s or 25 Gbits/s/channel. Six channel electrical signal output 412 includes electrical signal outputs 422, 424, 426, 428, 430, and 432. Electrical signal outputs 422, 424, 426, 428, 430, and 432 represent an output of a wavelength channel, with electrical signal outputs 424 and 426 representing one wavelength channel and electrical signal outputs 428 and 430 representing another wavelength channel.

Optical signal inputs 414 and 420 are each input into a corresponding one of amplifiers 406 via a corresponding one of photodetectors 404. The resultant electrical signal outputs of amplifiers 406 for corresponding optical signal inputs 414 and 420 are electrical signal outputs 422 and 432, respectively, each at 25 Gbits/s, which is the same as the bit rate of the optical signal inputs. Optical signal input 416 and optical signal input 418 are input into a corresponding one of electronic time-division de-multiplexers 408 via corresponding photodetectors 404 and amplifiers 406. The resultant electrical signal output of a corresponding one of electronic time-division de-multiplexers 408 for optical signal input 416 is electrical signal outputs 424 and 426, which are at 25 Gbits/s each instead of 50 Gbits/s due to the electronic time-division de-multiplexing of corresponding optical signal input 416. Similarly, the resultant electrical signal output of a corresponding one of electronic time-division de-multiplexers 408 for optical signal input 418 is electrical signal outputs 428 and 430, which also are at 25 Gbits/s each. Electrical signal outputs 422, 424, 426, 438, 430, and 432 may be input, for example, into a host processor unit for data processing.

Figure 5:
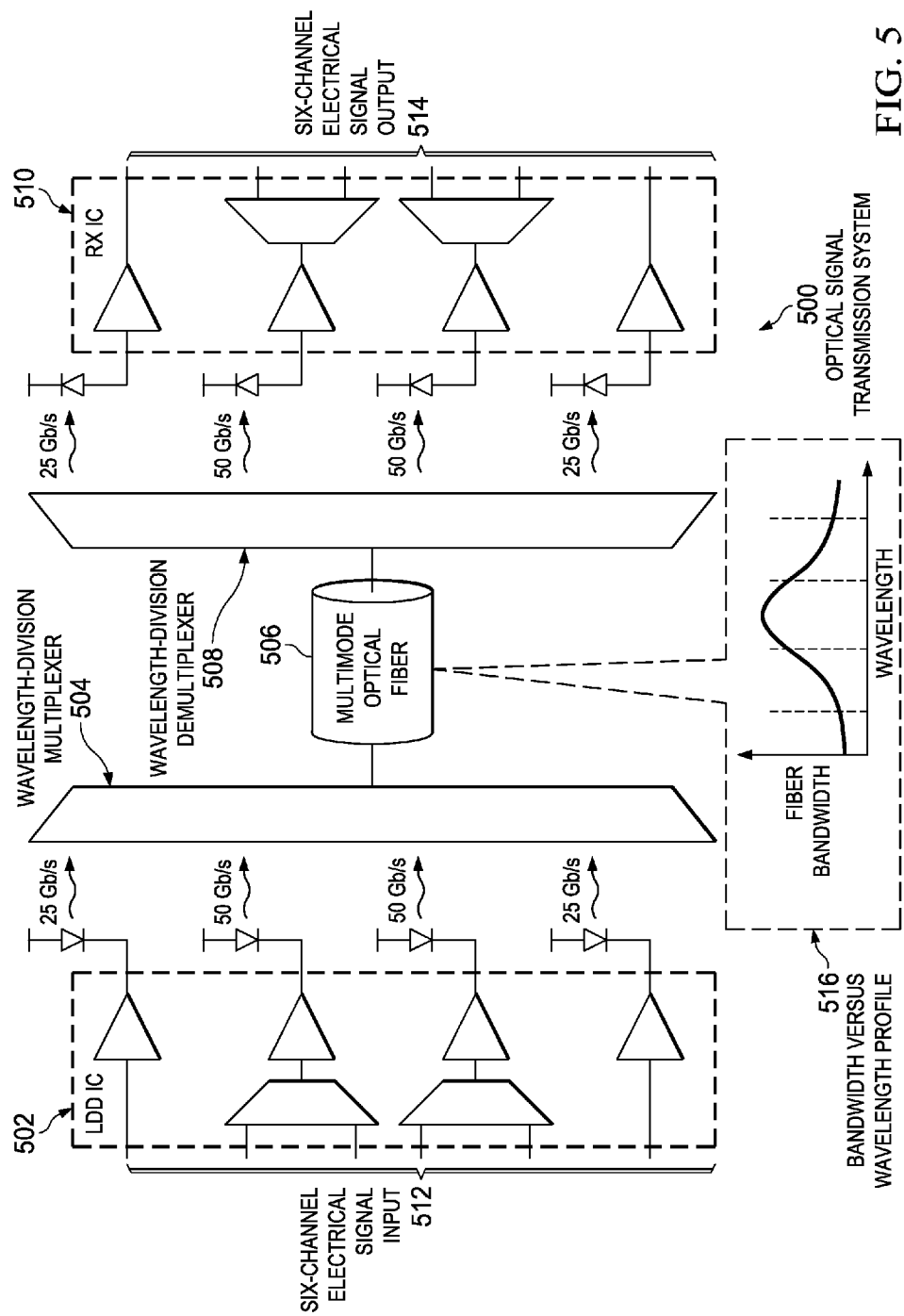
FIG. 5 is a diagram of an example of an optical signal transmission system in accordance with an illustrative embodiment.

With reference now to FIG. 5, a diagram of an example of an optical signal transmission system is depicted in accordance with an illustrative embodiment. Optical signal transmission system 500 may be implemented in a fiber-optic network of computers and other devices, such as, for example, network data processing system 100 in FIG. 1. Optical signal transmission system 500 includes LDD IC 502, wavelength-division multiplexer 504, multimode optical fiber 506, wavelength-division de-multiplexer 508, and RX IC 510. LDD IC 502 may be, for example, LDD IC 302 in FIG. 3. Multimode optical fiber 506 may be, for example, a standard multimode optical fiber or a nonstandard multimode optical fiber. RX IC 510 may be, for example, RX IC 402 in FIG. 4.

In this example, LDD IC 502 receives 6 channel electrical signal input 512, which is similar to 6 channel electrical signal input 310 in FIG. 3. Each of the 6 channels of electrical signal input has a bit rate of 25 Gbits/s. The output of the laser diodes driven by the laser diode drivers of LDD IC 502 is similar to 4 channel optical signal output 312 in FIG. 3 and is input into wavelength-division multiplexer 504. Wavelength-division multiplexer 504 combines the 4 channels of independent optical signals into a single beam of light and couples that single beam of light into multimode optical fiber 506 for transmission to RX IC 510 via wavelength-division de-multiplexer 508.

Wavelength-division de-multiplexer 508 separates the single beam of light into 4 channels of independent optical signal inputs, such as 4 channel optical signal input 410 in FIG. 4. RX IC 510 process the 4 channels of optical signal inputs to generate 6 channel electrical signal output 514, which is similar to 6 channel electrical signal output 412 in FIG. 4. Each of the 6 channels of electrical signal output has a bit rate of 25 Gbits/s, which is the same bit rate as 6 channel electrical signal input 512. Bandwidth versus wavelength profile 516 of multimode optical fiber 506 is similar to the bandwidth versus wavelength profile illustrated in the example of FIG. 3.

Figure 6:
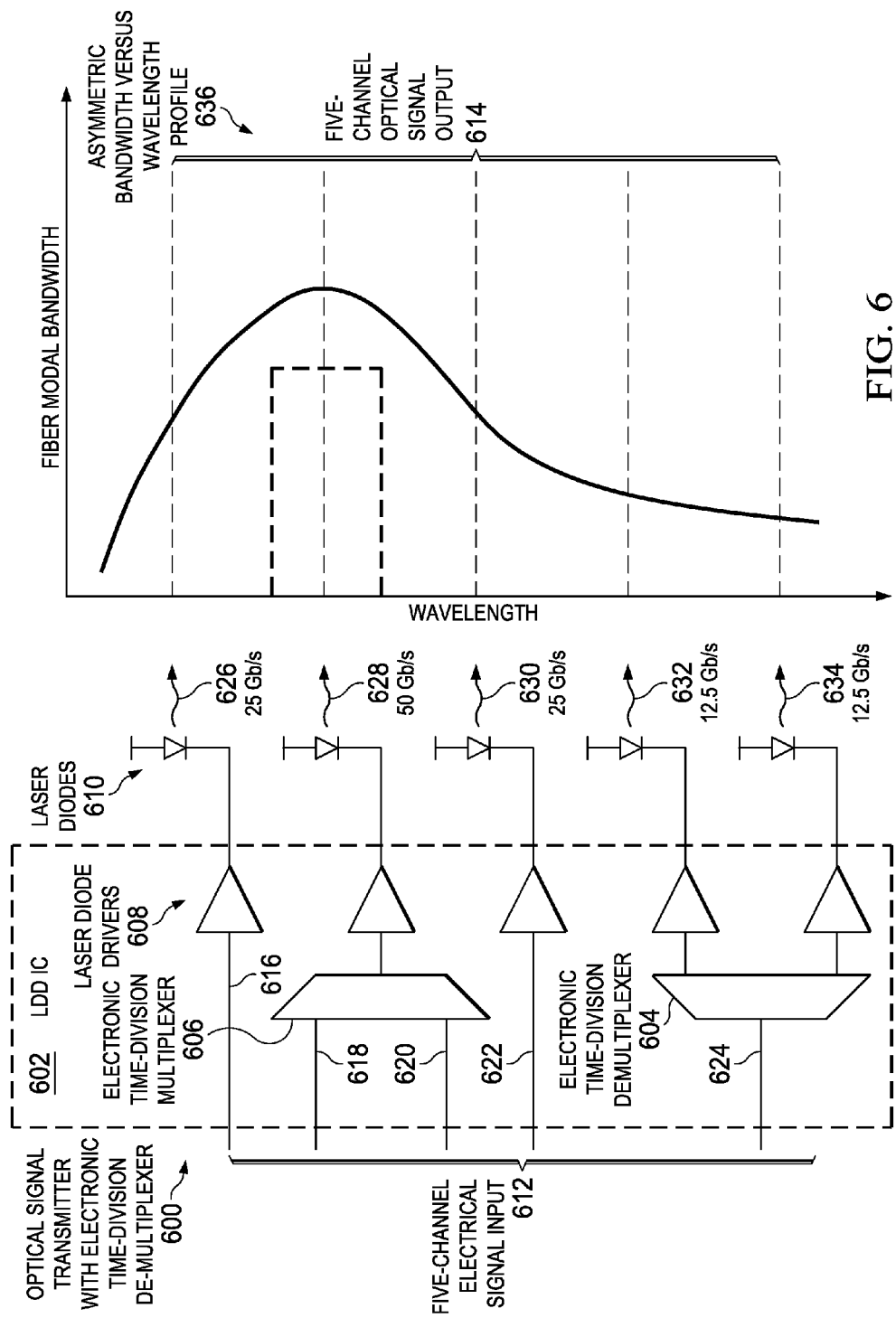
FIG. 6 is a diagram of an example of an optical transmitter with electronic time-division de-multiplexer in accordance with an illustrative embodiment.

With reference now to FIG. 6, a diagram of an example of an optical transmitter with electronic time-division de-multiplexer is depicted in accordance with an illustrative embodiment. Optical transmitter with electronic time-division de-multiplexer 600 includes LDD IC 602. LDD IC 602 is similar to LDD IC 302 in FIG. 3, except LDD IC 602 includes electronic time-division de-multiplexer 604 in addition to electronic time-division multiplexer 606. Electronic time-division de-multiplexer 604 is similar to one of electronic time-division de-multiplexers 408 in FIG. 4. Electronic time-division multiplexer 606 may be, for example, one of electronic time-division multiplexers 304 in FIG. 3. In this example, LDD IC 602 includes one electronic time-division de-multiplexer and one electronic time-division multiplexer, but illustrative embodiments are not restricted to such. In other words, illustrative embodiments may include more or fewer electronic time-division de-multiplexers and multiplexers on LDD IC 602 than illustrated.

LDD IC 602 also includes laser diode drivers 608, which drive laser diodes 610. Laser diode drivers 608 and laser diodes 610 may be, for example, laser diode drivers 306 and laser diodes 308 in FIG. 3. In this example, LDD IC 602 includes five laser diode drivers that drive five laser diodes, but illustrative embodiments are not restricted to such. In other words, illustrative embodiments may include more or fewer laser diode drivers and laser diodes than illustrated.

Also in this example, LDD IC 602 receives 5 channel electrical signal input 612 and outputs 5 channel optical signal output 614. Five channel electrical signal input 612 represents five individual channels of electrical signal inputs, each channel having an electrical signal input of 25 Gbits/s or 25 Gbits/s/channel. Five channel electrical signal input 612 includes electrical signal inputs 616, 618, 620, 622, and 624, which may be received from the host processor unit, for example. Five channel optical signal output 614 represents five individual channels of optical signal outputs, which include optical signal outputs 626, 628, 630, 632, and 634. Each of optical signal outputs 626, 628, 630, 632, and 634 represents a different wavelength channel output by a corresponding one of laser diodes 610.

Electrical signal inputs 616 and 622 are each input into a corresponding one of laser diode drivers 608, which in turn drive a corresponding one of laser diodes 610. The resultant optical signal outputs of laser diodes 610 for corresponding electrical signal inputs 616 and 622 are optical signal outputs 626 and 630, each at 25 Gbits/s, which is the same as the bit rate of the electrical signal inputs. Electrical signal inputs 618 and 620 are input into electronic time-division multiplexer 606. The output of electronic time-division multiplexer 606 is input into a corresponding one of laser diode drivers 608, which in turn drives a corresponding one of laser diodes 610. The resultant optical signal output of a corresponding one of laser diodes 610 for electrical signal inputs 618 and 620 is optical signal output 628, which is at 50 Gbits/s instead of 25 Gbits/s due to the electronic time-division multiplexing of electrical signal inputs 618 and 620.

Electrical signal input 624 is input into electronic time-division de-multiplexer 604. LDD IC 602 may utilize electronic time-division de-multiplexer 604 to reduce a bit rate received from the host processor unit when necessary. Outputs of electronic time-division de-multiplexer 604 are input into corresponding ones of laser diode drivers 608, which in turn drive corresponding ones of laser diodes 610. The resultant optical signal outputs of corresponding ones of laser diodes 610 for electrical signal input 624 is optical signal outputs 632 and 634, which are each at 12.5 Gbits/s instead of 25 Gbits/s due to the electronic time-division de-multiplexing of electrical signal input 624. An alternative to de-multiplexing a signal into two slower speed wavelength channels would be to change the incoming modulation format to one that uses less frequency spectrum. An example would be a 25 Gbits/s input signal in Non-Return-to-Zero (NRZ) modulation format being output as a 25 Gbits/s 4 level Pulse Amplitude Modulation (4-PAM) format. Higher order modulation formats could also be used.

Optical signal outputs 626, 628, 630, 632, and 634 of laser diodes 610 are input into the standard multimode optical fiber for transmission over a fiber-optic system network. Asymmetric bandwidth versus wavelength profile 636 illustrates the asymmetric profile of the standard multimode optical fiber as compared to the symmetric profile illustrated in the example of FIG. 3. It should be noted that an RX IC receiving optical signal outputs 626, 628, 630, 632, and 634 will include an electronic time-division de-multiplexer for optical signal output 628 and an electronic time-division multiplexer for optical signal outputs 632 and 634.

Figure 7:
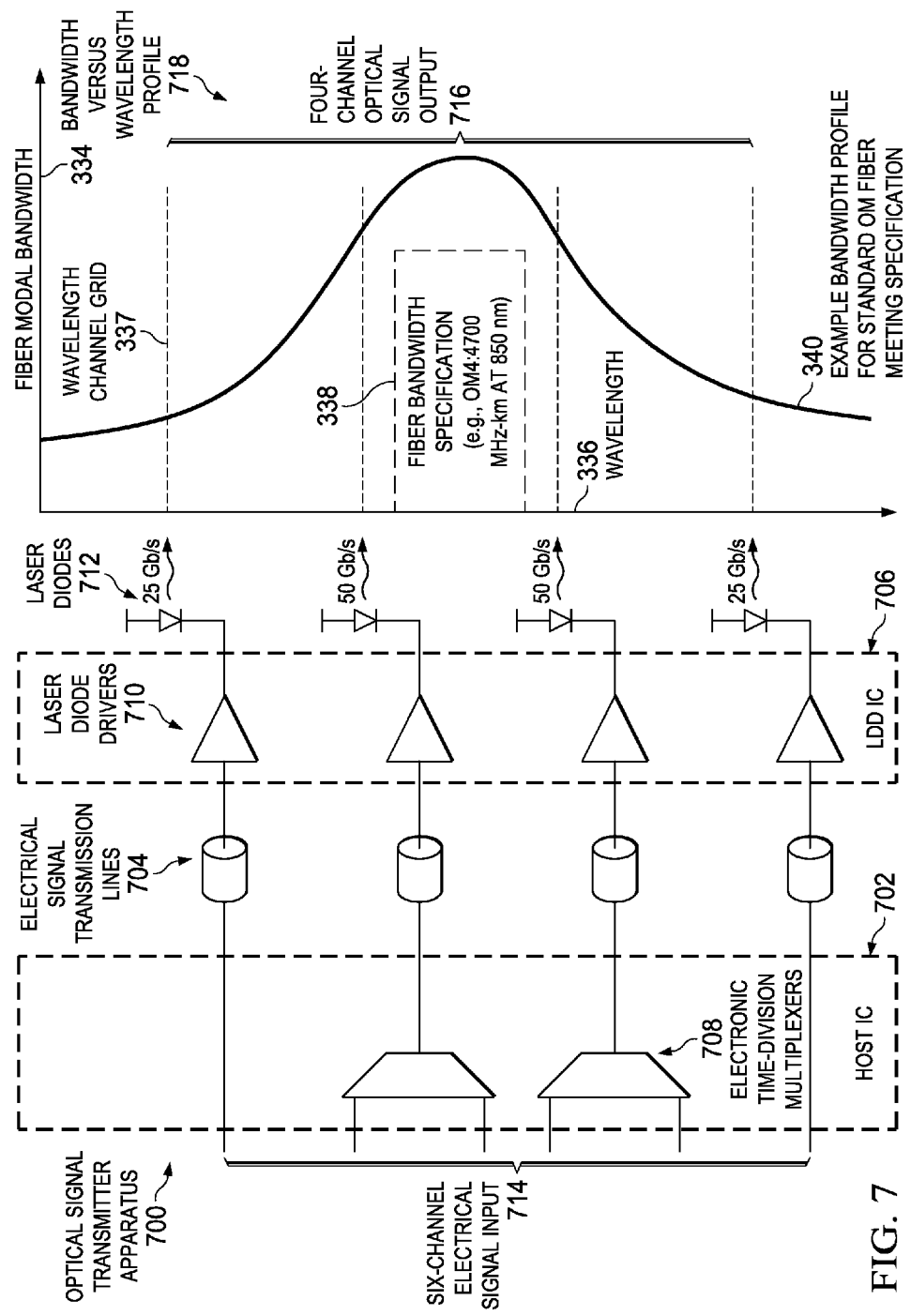
FIG. 7 is a diagram of an example of an optical signal transmitter apparatus in accordance with an illustrative embodiment.

With reference now to FIG. 7, a diagram of an example of an optical signal transmitter apparatus is depicted in accordance with an illustrative embodiment. Optical signal transmitter apparatus 700 may be implemented on a high-density chip carrier or printed circuit board, for example. Optical signal transmitter apparatus 700 includes host IC 702, electrical signal transmission lines 704, and LDD IC 706.

Host IC 702 includes electronic time-division multiplexers 708. Electronic time-division multiplexers 708 are similar to electronic time-division multiplexers 304 in FIG. 3. In this example, host IC 702 includes two electronic time-division de-multiplexers, but illustrative embodiments are not restricted to such. In other words, illustrative embodiments may include more or fewer electronic time-division multiplexers on host IC 702 than illustrated.

Electrical signal transmission lines 704 connect host IC 702 to LDD IC 706. Electrical signal transmission lines 704 may be transmission lines on the high-density chip carrier or printed circuit board. However, it should be noted that illustrative embodiments are not limited to utilizing electrical signal transmission lines. For example, alternative illustrative embodiments may utilize wire bonds instead of or in addition to transmission lines.

LDD IC 706 includes laser diode drivers 710, which drive laser diodes 712 to output the optical signals. Laser diode drivers 710 and laser diodes 712 may be, for example, laser diode drivers 306 and laser diodes 308 in FIG. 3. In this example, LDD IC 706 includes four laser diode drivers that drive four laser diodes, but illustrative embodiments are not restricted to such. In other words, illustrative embodiments may include more or fewer laser diode drivers and laser diodes on LDD IC 706 than illustrated.

Also in this example, host IC 702 receives 6 channel electrical signal input 714 and outputs 4 channel optical signal output 716. Six channel electrical signal input 714 is similar to 6 channel electrical signal input 310 in FIG. 3. Six channel electrical signal input 714 represents six individual channels of electrical signal inputs, each channel having an optical signal input of 25 Gbits/s. Four channel optical signal output 716 is similar to 4 channel optical signal output 312 of FIG. 3. Four channel optical signal output 716 represents four individual channels of optical signal outputs at 25 Gbits/s, 50 Gbits/s, 50 Gbits/s, and 25 Gbits/s, respectively.

Four channel optical signal output 716 of laser diodes 712 are input into a standard multimode optical fiber for transmission over a fiber-optic system network. Bandwidth versus wavelength profile 718 of the standard multimode optical fiber is similar to bandwidth versus wavelength profile 340 illustrated in the example of FIG. 3.

Figure 8:
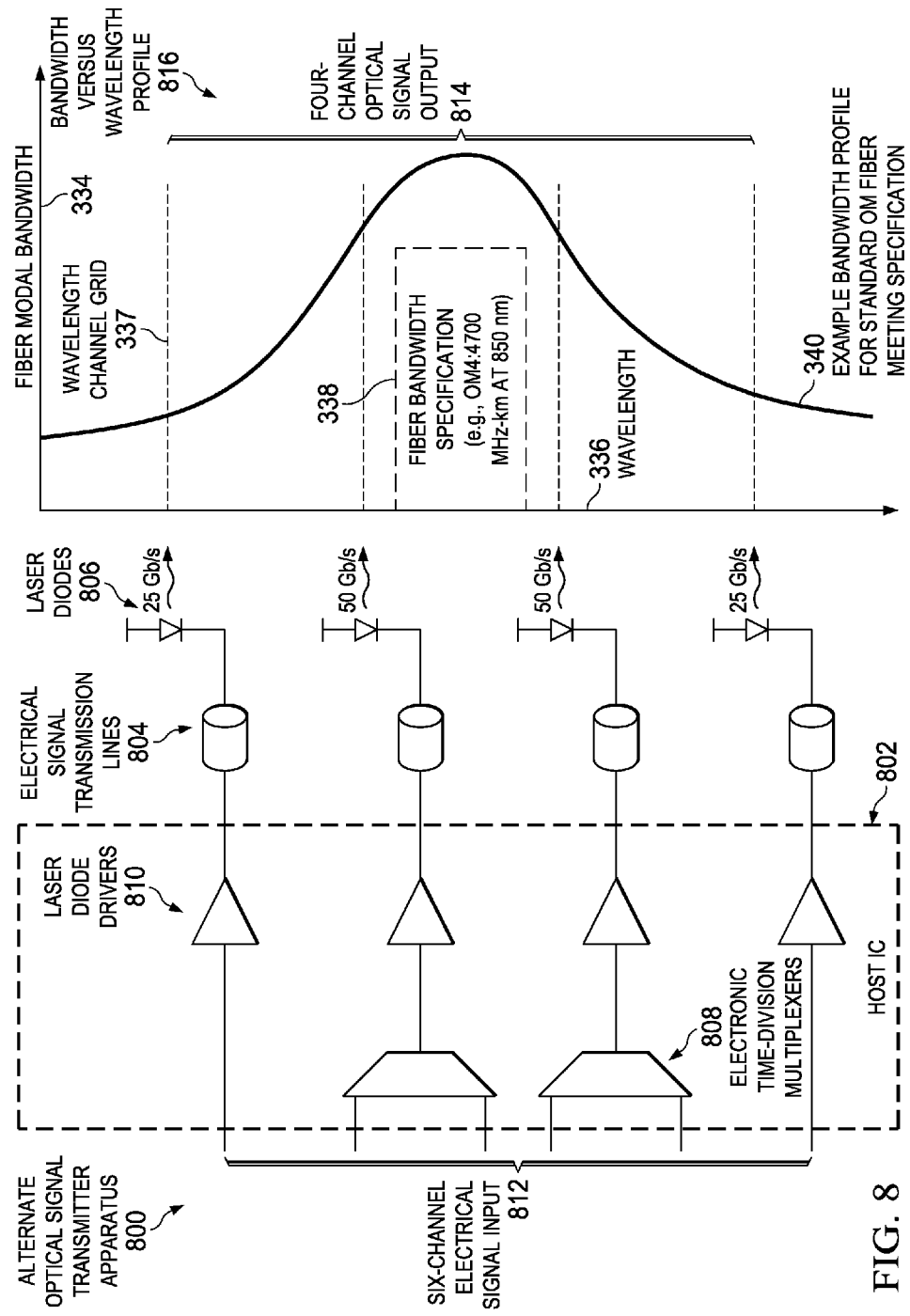
FIG. 8 is a diagram of an example of an alternative optical signal transmitter apparatus in accordance with an illustrative embodiment.

With reference now to FIG. 8, a diagram of an example of an alternative optical signal transmitter apparatus is depicted in accordance with an illustrative embodiment. Alternative optical signal transmitter apparatus 800 may be implemented on a high-density chip carrier or printed circuit board, for example. Alternative optical signal transmitter apparatus 800 includes host IC 802, electrical signal transmission lines 804, and laser diodes 806.

Host IC 802 includes electronic time-division multiplexers 808 and laser diode drivers 810. Electronic time-division multiplexers 808 may be, for example, electronic time-division multiplexers 708 in FIG. 7. In this example, host IC 802 includes two electronic time-division de-multiplexers, but illustrative embodiments are not restricted to such. In other words, illustrative embodiments may include more or fewer electronic time-division multiplexers on host IC 802 than illustrated.

Laser diode drivers 810 drive laser diodes 806 via electrical signal transmission lines 804. Electrical signal transmission lines 804 may be, for example, electrical signal transmission lines 704 in FIG. 7. In this example, alternative optical signal transmitter apparatus 800 includes four laser diode drivers that drive four laser diodes, but illustrative embodiments are not restricted to such. In other words, illustrative embodiments may include more or fewer laser diode drivers and laser diodes than illustrated.

Also in this example, host IC 802 receives 6 channel electrical signal input 812 and outputs 4 channel optical signal output 814. Six channel electrical signal input 812 may be, for example, 6 channel electrical signal input 714 in FIG. 7. Six channel electrical signal input 812 represents six individual channels of electrical signal inputs, each channel having an electrical signal input of 25 Gbits/s. Four channel optical signal output 814 may be, for example, 4 channel optical signal output 716 of FIG. 7. Four channel optical signal output 814 represents four individual channels of optical signal outputs at 25 Gbits/s, 50 Gbits/s, 50 Gbits/s, and 25 Gbits/s, respectively.

Four channel optical signal output 814 of laser diodes 806 are input into a standard multimode optical fiber for transmission over a fiber-optic system network. Bandwidth versus wavelength profile 816 of the standard multimode optical fiber may be, for example, bandwidth versus wavelength profile 718 in FIG. 7.

Figure 9:
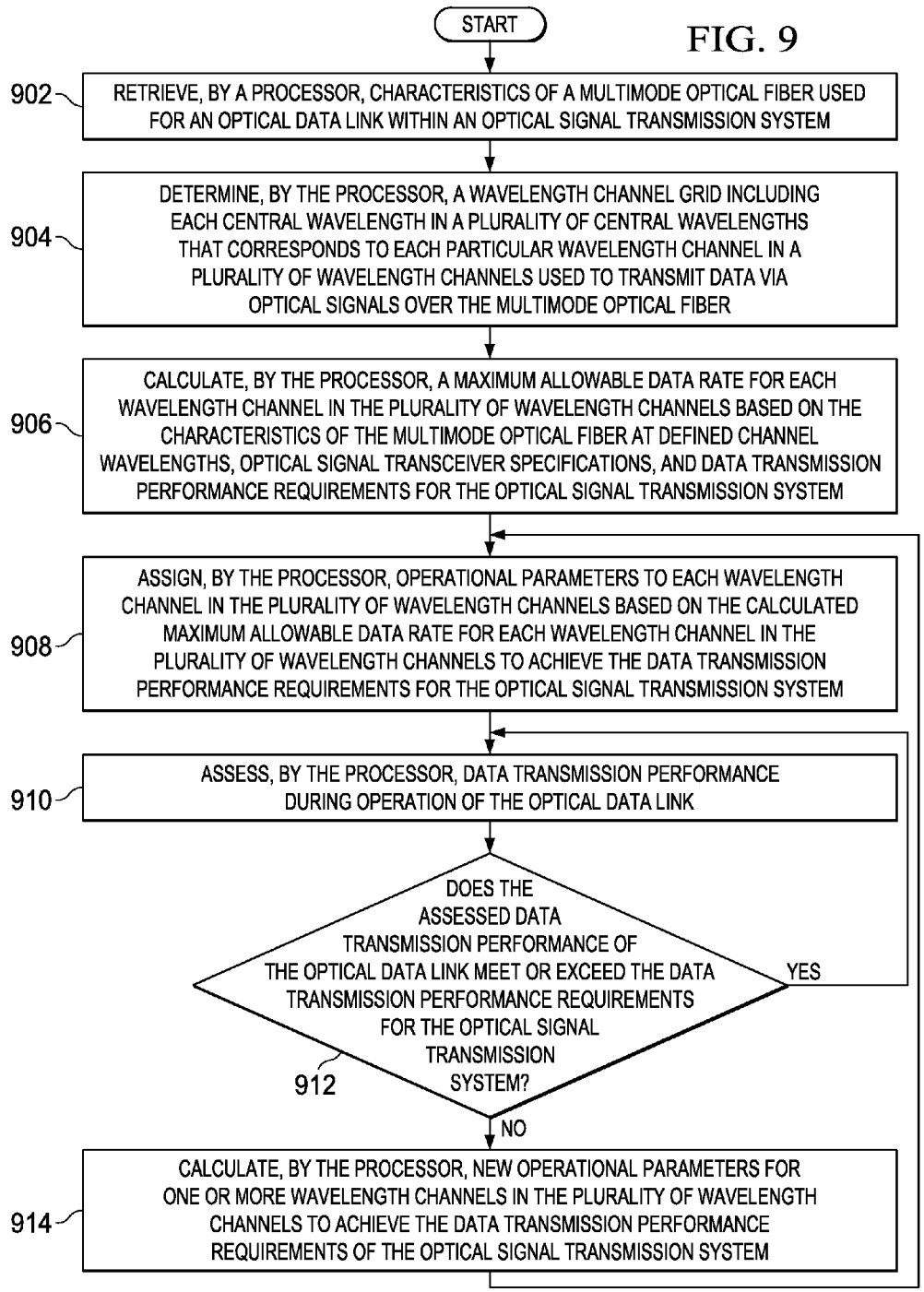
FIG. 9 is a flowchart illustrating a process for tuning parameters of individual wavelength channels transmitted over a standard multimode optical fiber in accordance with an illustrative embodiment.

With reference now to FIG. 9, a flowchart illustrating a process for tuning individual wavelength channels transmitted over a standard multimode optical fiber is shown in accordance with an illustrative embodiment. The process shown in FIG. 9 may be implemented in a computer, such as data processing system 200 in FIG. 2.

The process begins when a processor of the computer retrieves characteristics of the multimode optical fiber used for an optical data link within an optical signal transmission system (step 902). The processor may be, for example, processor unit 204 in FIG. 2. The multimode optical fiber may be, for example, multimode optical fiber 506 in FIG. 5. The characteristics may be, for example, multimode optical fiber characteristics 222 in FIG. 2. The optical signal transmission system may be, for example, optical signal transmission system 500 in FIG. 5.

It should be noted that the characteristics of the multimode optical fiber retrieved in step 902 may be obtained on a case-by-case basis, such as, for example, when upgrading optical signal transceivers in an existing fiber-optic system infrastructure. Alternatively, the characteristics of the multimode optical fiber may be obtained for an entire shipment of optical fiber cables based on optical fiber cable manufacturer specifications, for example. Also, it should be noted that characteristics of the multimode optical fiber may not be known. As a result, illustrative embodiments may determine the characteristics of the multimode optical fiber by field measurements using the transmission system.

In addition, the processor determines a wavelength channel grid including each central wavelength in a plurality of central wavelengths that corresponds to each particular wavelength channel in a plurality of wavelength channels used to transmit data via optical signals over the multimode optical fiber (step 904). The wavelength channel grid may be, for example, wavelength channel grid 224 in FIG. 2. The wavelength channel grid will likely be determined primarily by which optical signal transmitter and receiver sub-assemblies that are used in the fiber-optic system, and only secondarily by the characteristics of the multimode optical fiber.

Afterward, the processor calculates a maximum allowable data rate for each wavelength channel in the plurality of wavelength channels based on the characteristics of the multimode optical fiber at defined channel wavelengths, optical signal transceiver specifications, and data transmission performance requirements for the optical signal transmission system (step 906). The calculated maximum allowable data rate may be, for example, calculated maximum allowable data rate per wavelength channel 226 in FIG. 2. The characteristics of the multimode optical fiber may be, for example, multimode optical fiber characteristics 222 in FIG. 2. The optical signal transceiver specifications may be, for example, transmitter output power, extinction ratio, receiver sensitivity, and any transmitter or receiver-specific penalties, such as those resulting from relative intensity noise, inter-symbol interference, or inter-channel crosstalk. The data transmission performance requirements may be, for example, a specified bit error rate, signal-to-noise ratio, or a threshold packet loss rate.

Then, the processor assigns operational parameters to each wavelength channel in the plurality of wavelength channels based on the calculated maximum allowable data rate for each wavelength channel in the plurality of wavelength channels to achieve the data transmission performance requirements for the optical signal transmission system (step 908). The operational parameters may be, for example, wavelength channel operation parameters 220 in FIG. 2. It should be noted that step 906 and 908 may be performed, for example, at optical data link startup by auto-training each wavelength channel within a given optical data link. This way, each optical data link continues to modify its data rate and/or tune its equalization parameters while monitoring its error transmission rate in order to reach the desired goals for maximum throughput, minimum power consumption, etc. When training is complete, the given optical data link may be utilized. Alternatively, step 906 and 908 may be performed at the design phase of the fiber-optic system.

Further, the processor assesses data transmission performance during operation of the optical data link (step 910). The practice of assessing link performance in-situ is well known in the industry. Examples include, training sequences, bit error rate measurement, and/or eye opening measurement, which may include timing and amplitude margin determination. This performance information, which is collected on the receiver side of a link, is sent back to the processor or transceiver on the transmitting side in a manner that is known in the industry. Examples include using a service processor network, using out-of-band signaling on the return fibers, using a spare fiber or wavelength channel, etc. In addition, the processor makes a determination as to whether the assessed data transmission performance of the optical data link meets or exceeds the data transmission performance requirements for the optical signal transmission system (step 912). It should be noted that the determination may be made on demand, on a predetermined time interval basis, or as needed as determined by a data transmission performance process or algorithm.

If the processor determines that the assessed data transmission performance of the optical data link does meet or exceed the data transmission performance requirements for the optical signal transmission system, yes output of step 912, then the process returns to step 910 where the processor continues to assess the data transmission performance. If the processor determines that the assessed data transmission performance of the optical data link does not meet or exceed the data transmission performance requirements for the optical signal transmission system, no output of step 912, then the processor calculates new operational parameters for one or more wavelength channels in the plurality of wavelength channels to achieve the data transmission performance requirements of the optical signal transmission system (step 914). Thereafter, the process returns to step 908 where the processor assigns the new operational parameters to the one or more wavelength channels.

It should be noted that steps 912-914 are optional steps. In other words, alternative illustrative embodiments do not have to perform steps 912-914. These optional steps provide alternative illustrative embodiments the ability to manage the optical data link's power consumption on the fly by reducing a particular wavelength channel's data rate, reducing a particular wavelength channel's output power, enabling or disabling a particular wavelength channel, and the like. Thus, alternative illustrative embodiments not only have the ability to manage power on a channel-by-channel basis, but also to provide certain channels with degrees of power management capabilities.

Figure 10:
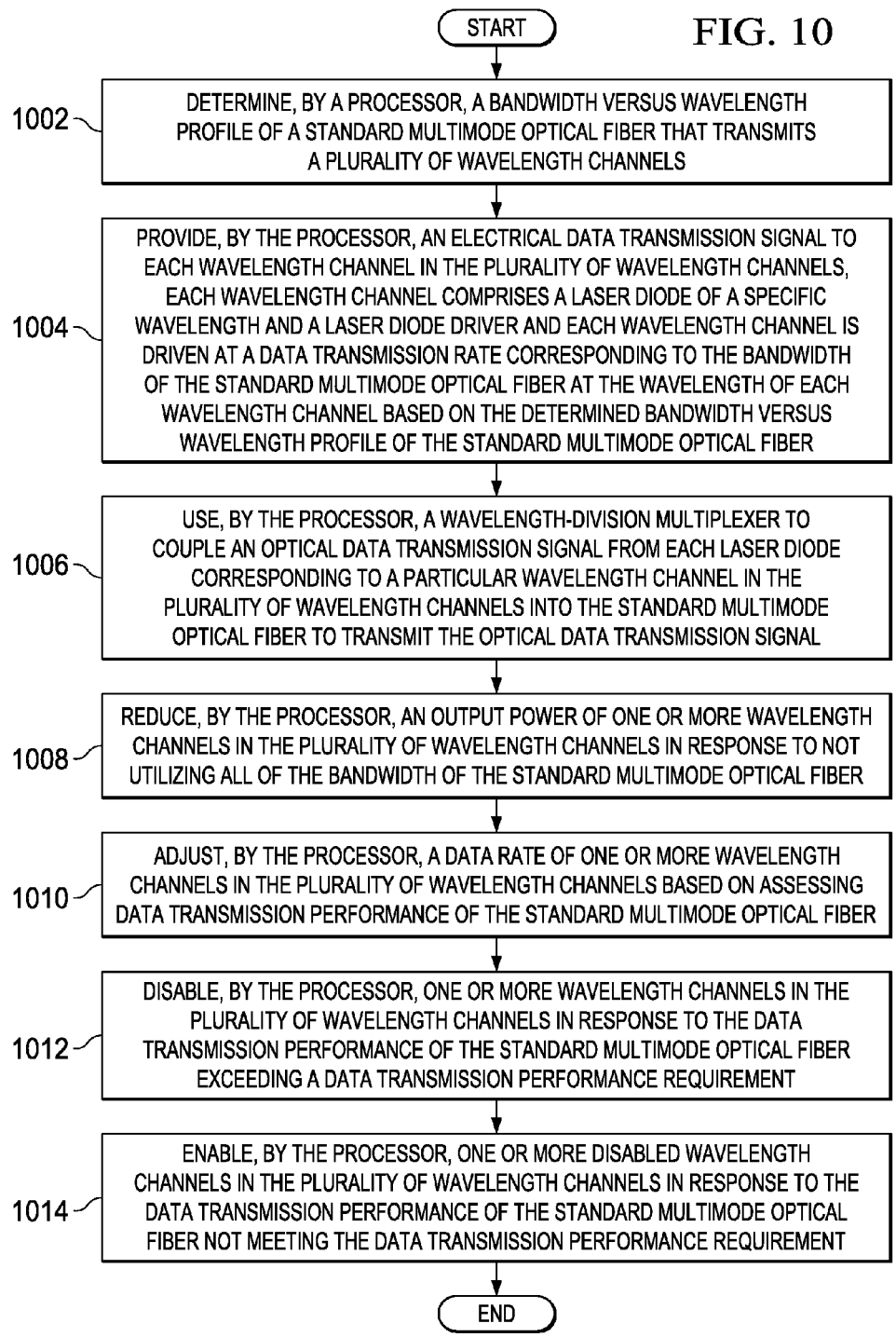
FIG. 10 is a flowchart illustrating a process for transmitting coarse wavelength-division multiplexed optical signals over a standard multimode optical fiber in accordance with an illustrative embodiment.

With reference now to FIG. 10, a flowchart illustrating a process for transmitting coarse wavelength-division multiplexed optical signals over a standard multimode optical fiber is shown in accordance with an illustrative embodiment. The process shown in FIG. 10 may be implemented in a computer, such as data processing system 200 in FIG. 2.

The process begins when a processor of the computer determines a bandwidth versus wavelength profile of the standard multimode optical fiber that transmits a plurality of wavelength channels (step 1002). The processor may be, for example, processor unit 204 in FIG. 2. The bandwidth versus wavelength profile may be, for example, bandwidth versus wavelength profile 230 in FIG. 2. The standard multimode optical fiber may be, for example, multimode optical fiber 506 in FIG. 5.

In addition, the processor provides an optical data transmission signal to each wavelength channel in the plurality of wavelength channels, each wavelength channel comprises a laser diode of a specific wavelength and a laser diode driver and each wavelength channel is driven at a data transmission rate corresponding to the bandwidth of the standard multimode optical fiber at the wavelength of each wavelength channel based on the determined bandwidth versus wavelength profile of the standard multimode optical fiber (step 1004). The optical data transmission signal to each wavelength channel in the plurality of wavelength channels may be, for example, 6 channel optical signal input 310 in FIG. 3. The laser diode and corresponding laser diode driver for each wavelength channel may be, for example, laser diodes 308 and laser diode drivers 306 in FIG. 3.

Further, the processor uses a wavelength-division multiplexer to couple the optical data transmission signal from each laser diode corresponding to a particular wavelength channel in the plurality of wavelength channels into the standard multimode optical fiber to transmit the optical data transmission signal (step 1006). The wavelength-division multiplexer may be, for example, wavelength-division multiplexer 504 in FIG. 5. Then, the processor reduces an output power of one or more wavelength channels in the plurality of wavelength channels in response to not utilizing all of the bandwidth of the multimode optical fiber (step 1008).

The processor also adjusts a data rate of one or more wavelength channels in the plurality of wavelength channels based on assessing data transmission performance of the multimode optical fiber (step 1010). In addition, the processor disables one or more wavelength channels in the plurality of wavelength channels in response to the data transmission performance of the multimode optical fiber exceeding a data transmission performance requirement (step 1012). The data transmission performance requirement may be, for example, one requirement in optical signal transmission performance requirements 228 in FIG. 2. Further, the processor enables one or more disabled wavelength channels in the plurality of wavelength channels in response to the data transmission performance of the multimode optical fiber not meeting the data transmission performance requirement (step 1014). Thereafter, the process terminates.

Figure 11:
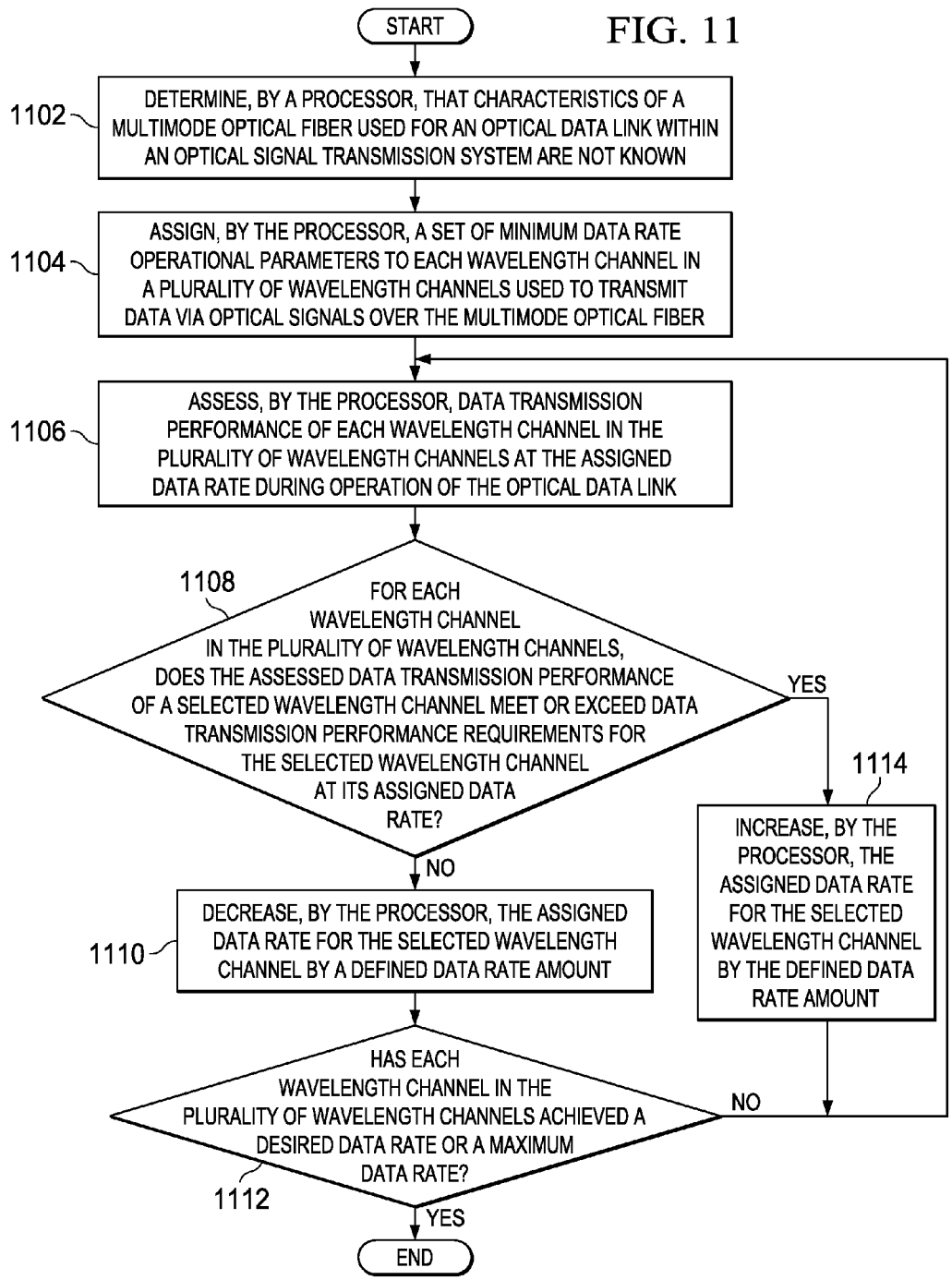
FIG. 11 is a flowchart illustrating a process for tuning parameters of wavelength channels transmitted over a multimode optical fiber when characteristics of the multimode optical fiber are not known in accordance with an illustrative embodiment.

With reference now to FIG. 11, a flowchart illustrating a process for tuning parameters of wavelength channels transmitted over a multimode optical fiber when characteristics of the multimode optical fiber are not known is shown in accordance with an illustrative embodiment. The process shown in FIG. 11 may be implemented in a computer, such as data processing system 200 in FIG. 2.

The process begins when a processor of the computer determines that characteristics of a multimode optical fiber used for an optical data link within an optical signal transmission system are not known (step 1102). The processor may be, for example, processor unit 204 in FIG. 2. Afterward, the processor assigns a set of minimum data rate operational parameters to each wavelength channel in a plurality of wavelength channels used to transmit data via optical signals over the multimode optical fiber (step 1104). In addition, the processor assesses data transmission performance of each wavelength channel in the plurality of wavelength channels at the assigned data rate during operation of the optical data link (step 1106).

For each wavelength channel in the plurality of wavelength channels, the processor makes a determination as to whether the assessed data transmission performance of a selected wavelength channel meets or exceeds data transmission performance requirements for the selected wavelength channel at its assigned data rate (step 1108). If the processor determines that the assessed data transmission performance of the selected wavelength channel fails to meet or exceed the data transmission performance requirements for the selected wavelength channel at its assigned data rate, no output of step 1108, then the processor decreases the assigned data rate for the selected wavelength channel by a defined data rate amount (step 1110). Subsequently, the processor makes a determination as to whether each wavelength channel in the plurality of wavelength channels has achieved a desired data rate or a maximum data rate (step 1112).

If the processor determines that each wavelength channel in the plurality of wavelength channels has achieved a desired data rate or a maximum data rate, yes output of step 1112, then the process terminates thereafter. If the processor determines that each wavelength channel in the plurality of wavelength channels has not achieved a desired data rate or a maximum data rate, no output of step 1112, then the process returns to step 1106 where the processor continues to assess data transmission performance of each wavelength channel.

Returning again to step 1108, if the processor determines that the assessed data transmission performance of the selected wavelength channel meets or exceeds the data transmission performance requirements for the selected wavelength channel at its assigned data rate, yes output of step 1108, then the processor increases the assigned data rate for the wavelength channel by the defined data rate amount (step 1114). Thereafter, the process returns to step 1106 where the processor continues to assess data transmission performance of each wavelength channel.

Thus, illustrative embodiments provide a computer-implemented method, computer system, computer program product, and optical transceiver for transmitting coarse wavelength-division multiplexed optical signals over a standard multimode optical fiber by adjusting a data rate of each individual channel transmitted over the standard multimode optical fiber to match a modal bandwidth of the standard multimode optical fiber at the wavelength of each individual channel. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The circuits as described above are part of a design for an integrated circuit chip. The chip design is created in a graphical computer programming language and stored in a computer readable storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the computer readable storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

What is claimed is:

1. A computer system for tuning parameters of individual wavelength channels transmitted over a multimode optical fiber, the computer system comprising:
   a bus system;
   a storage device connected to the bus system, wherein the storage device stores program instructions; and
   a processor connected to the bus system, wherein the processor executes the program instructions to:
   retrieve characteristics of the multimode optical fiber used for an optical data link within an optical signal transmission system;
   determine a wavelength channel grid including each central wavelength in a plurality of central wavelengths that corresponds to each particular wavelength channel in a plurality of wavelength channels used to transmit data via optical signals over the multimode optical fiber;
   calculate a maximum allowable data rate for each wavelength channel in the plurality of wavelength channels based on the characteristics of the multimode optical fiber at defined channel wavelengths, optical signal transceiver specifications, and data transmission performance requirements for the optical signal transmission system;
   assign operational parameters to each wavelength channel in the plurality of wavelength channels based on the calculated maximum allowable data rate for each wavelength channel in the plurality of wavelength channels to achieve the data transmission performance requirements for the optical signal transmission system;
   determine a bandwidth versus wavelength profile of the multimode optical fiber that transmits the plurality of wavelength channels;
   provide an electrical data transmission signal to each wavelength channel in the plurality of wavelength channels, each wavelength channel comprises a laser diode of a specific wavelength and a laser diode driver and each wavelength channel is driven at a data transmission rate corresponding to the bandwidth of the multimode optical fiber at the wavelength of each wavelength channel based on the determined bandwidth versus wavelength profile of the multimode optical fiber; and
   use a wavelength-division multiplexer to couple an optical data transmission signal from each laser diode corresponding to a particular wavelength channel in the plurality of wavelength channels into the multimode optical fiber to transmit the optical data transmission signal.

2. The computer system of claim 1, wherein the processor further executes the program instructions to:
   assess data transmission performance during operation of the optical data link.

3. The computer system of claim 2, wherein the processor further executes the program instructions to:
   calculate new operational parameters for one or more wavelength channels in the plurality of wavelength channels to achieve the data transmission performance requirements of the optical signal transmission system in response to determining that the assessed data transmission performance of the optical data link does not meet or exceed the data transmission performance requirements for the optical signal transmission system.

4. The computer system of claim 1, wherein the processor further executes the program instructions to:
   reduce an output power of one or more wavelength channels in the plurality of wavelength channels in response to not utilizing all of a bandwidth of the multimode optical fiber.

5. The computer system of claim 1, wherein the processor further executes the program instructions to:
   adjust a data rate of one or more wavelength channels in the plurality of wavelength channels based on assessing data transmission performance of the multimode optical fiber.

6. The computer system of claim 1, wherein the processor further executes the program instructions to:
   disable one or more wavelength channels in the plurality of wavelength channels in response to data transmission performance of the multimode optical fiber exceeding the data transmission performance requirements.

7. A computer program product for tuning parameters of individual wavelength channels transmitted over a multimode optical fiber, the computer program product comprising a non-transitory computer readable storage medium having program instructions embodied therewith, the program instructions executable by a processor of a computer to cause the processor to perform a method comprising:

retrieving, by the processor, characteristics of the multimode optical fiber used for an optical data link within an optical signal transmission system;

determining, by the processor, a wavelength channel grid including each central wavelength in a plurality of central wavelengths that corresponds to each particular wavelength channel in a plurality of wavelength channels used to transmit data via optical signals over the multimode optical fiber;

calculating, by the processor, a maximum allowable data rate for each wavelength channel in the plurality of wavelength channels based on the characteristics of the multimode optical fiber at defined channel wavelengths, optical signal transceiver specifications, and data transmission performance requirements for the optical signal transmission system;

assigning, by the processor, operational parameters to each wavelength channel in the plurality of wavelength channels based on the calculated maximum allowable data rate for each wavelength channel in the plurality of wavelength channels to achieve the data transmission performance requirements for the optical signal transmission system;

determining, by the processor, a bandwidth versus wavelength profile of the multimode optical fiber that transmits the plurality of wavelength channels;

providing, by the processor, an electrical data transmission signal to each wavelength channel in the plurality of wavelength channels, each wavelength channel comprises a laser diode of a specific wavelength and a laser diode driver and each wavelength channel is driven at a data transmission rate corresponding to the bandwidth of the multimode optical fiber at the wavelength of each wavelength channel based on the determined bandwidth versus wavelength profile of the multimode optical fiber; and using, by the processor, a wavelength-division multiplexer to couple an optical data transmission signal from each laser diode corresponding to a particular wavelength channel in the plurality of wavelength channels into the multimode optical fiber to transmit the optical data transmission signal.

8. The computer program product of claim 7 further comprising:
    assessing, by the processor, data transmission performance during operation of the optical data link.

9. The computer program product of claim 8 further comprising:
    responsive to the processor determining that the assessed data transmission performance of the optical data link does not meet or exceed the data transmission performance requirements for the optical signal transmission system, calculating, by the processor, new operational parameters for one or more wavelength channels in the plurality of wavelength channels to achieve the data transmission performance requirements of the optical signal transmission system.

10. The computer program product of claim 7 further comprising:
    reducing, by the processor, an output power of one or more wavelength channels in the plurality of wavelength channels in response to not utilizing all of a bandwidth of the multimode optical fiber.

11. The computer program product of claim 7 further comprising:
    adjusting, by the processor, a data rate of one or more wavelength channels in the plurality of wavelength channels based on assessing data transmission performance of the multimode optical fiber.

12. The computer program product of claim 7 further comprising:
    disabling, by the processor, one or more wavelength channels in the plurality of wavelength channels in response to data transmission performance of the multimode optical fiber exceeding the data transmission performance requirements.

13. The computer program product of claim 7 further comprising:
    enabling, by the processor, one or more disabled wavelength channels in the plurality of wavelength channels in response to data transmission performance of the multimode optical fiber not meeting the data transmission performance requirements.

* * * * *